United States Patent
Noffz (10) Patent No.: US 7,905,461 B2
(45) Date of Patent: Mar. 15, 2011

(54) SEAT TRACK LATCH ASSEMBLY

(75) Inventor: Karl Noffz, Waterford, MI (US)

(73) Assignee: Johnson Controls Technology Company, Holland, MI (US)

(*) Notice: Subject to any disclaimer, the term of this patent is extended or adjusted under 35 U.S.C. 154(b) by 0 days.

(21) Appl. No.: 11/436,275

(22) Filed: May 18, 2006

(65) Prior Publication Data

US 2006/0261237 A1 Nov. 23, 2006

Related U.S. Application Data

(60) Provisional application No. 60/682,588, filed on May 19, 2005.

(51) Int. Cl.
*F16M 13/00* (2006.01)
(52) U.S. Cl. ............... 248/429; 248/424; 297/344.11
(58) Field of Classification Search ........... 248/429, 248/424; 297/344.11
See application file for complete search history.

(56) References Cited

U.S. PATENT DOCUMENTS

| | | | | |
|---|---|---|---|---|
| 5,913,947 A * | 6/1999 | Groche | ......................... | 74/527 |
| 5,918,846 A * | 7/1999 | Garrido | ......................... | 248/429 |
| 6,113,051 A * | 9/2000 | Moradell et al. | ............ | 248/430 |
| 6,308,589 B1 * | 10/2001 | Schuler et al. | .................. | 74/538 |
| 6,322,036 B1 * | 11/2001 | Tame et al. | ................... | 248/429 |
| 6,637,712 B1 * | 10/2003 | Lagerweij | .................... | 248/429 |
| 7,207,541 B2 * | 4/2007 | Frohnhaus et al. | .......... | 248/429 |
| 2002/0079418 A1 | 6/2002 | Tame et al. | ................... | 248/429 |
| 2002/0179800 A1 * | 12/2002 | Flick | ............................. | 248/429 |
| 2005/0247846 A1 * | 11/2005 | Jeong | ............................ | 248/429 |

* cited by examiner

*Primary Examiner* — Amy J. Sterling
(74) *Attorney, Agent, or Firm* — Butzel Long (57) ABSTRACT

A track system for a seat is disclosed. The track system comprises a first track including a plurality of apertures; a second track configured to move relative to the first track and including a plurality of apertures; and a latch assembly coupled to the first track. The latch assembly comprises a base, a first pin, and a second pin. The base comprises a first slot and a second slot. The first pin is moveable in the first slot between a first position, in which the first pin engages the second track and cants in a first direction, and a second position, in which the first pin disengages the second track. The second pin is moveable in the second slot between a first position, in which the second pin engages the second track and cants in a second direction, and a second position, in which the second pin disengages the second track.

50 Claims, 8 Drawing Sheets

SEAT TRACK LATCH ASSEMBLY

CROSS-REFERENCE TO RELATED PATENT APPLICATIONS

The present application claims priority under 35 U.S.C. §119 from U.S. Application No. 60/682,588, filed May 19, 2005, the full disclosure of which is hereby incorporated herein by reference in its entirety.

BACKGROUND

The present invention relates generally to the field of seat track assemblies for adjustable vehicle seats. More particularly, the present invention relates to latch assemblies for use with seat track assemblies.

Vehicle seat assemblies are typically provided with a track system that enables the position of the seat assembly within the vehicle to be adjusted in the forward and reward direction. Such adjustment capability is desirable to enable vehicle operators of various sizes to be seated comfortably and properly for operating the motor vehicle. Such seat assemblies typically include two or more tracks that move relative to one another and a latching mechanism that releasably retains the tracks (and therefore the seat assembly) in a locked position relative to one another until the latch mechanism is released. Once the latch mechanism is released, the tracks can be moved relative to one another, which allows the occupant of the seat assembly to adjust the position of the seat assembly and to then reengage or release the latching mechanism to hold the seat in the new location.

Latch mechanisms typically retain the seat assembly in a particular position by inserting one or more pins through apertures and/or slots that are provided in or on the tracks that make up the track system, which has the effect of locking the tracks in position with respect to one another. To unlock the tracks and allow the occupant of a seat to adjust the position of the seat, the pin is removed from the apertures. However, in order for the pins to be inserted into and removed from the apertures and/or slots in the tracks, the apertures and/or slots have to be larger than the corresponding pins. This creates a gap or space between the pins and the apertures or slots, which in turn results in "chuck" or "play" between the pins and the tracks. The extent of the chuck or play depends on the size of the gap or space between the pins and the apertures, which varies due to normal manufacturing tolerances of the pins and the tracks. As a result of these manufacturing tolerances, the latch assemblies of many seat assemblies are susceptible to chuck or play, which can be irritating to an occupant of the seat.

To provide a reliable, widely acceptable seat track latch assembly for allowing for the fore/aft adjustment of a seat assembly, which avoids one or more of the above-referenced and other problems would represent a significant advance in the art.

SUMMARY

In one embodiment, the invention relates to a seat track latch assembly for use with a track system that includes a lower track configured to be coupled to the vehicle and an upper track that couples to the lower track in a manner that allows the upper track (and a seat coupled to the upper track) to move relative to the lower track. A wall of the upper track includes a series of intermittently spaced apertures that align with apertures provided in a channel of the lower track as the upper track moves relative to the lower track.

The latch assembly includes a base, a pivot rod, an actuating member, six load pins, two chuck pins, and a biasing apparatus. The base is coupled to the side of the channel of the lower track and provides slots for receiving the six load pins and the two chuck pins. The pivot rod is coupled to the base and the actuating member in a manner that allows the actuating member to pivot or rotate relative to the base. Each of the six load pins and two chuck pins is configured to slide within the respective slot of the base between an engaged position and a disengaged position. In the engaged position, each of the six load pins and the two chuck pins extend through corresponding apertures in the channel of the lower track as well as through an aperture in the upper track to releasably lock the upper track in position relative to the lower track. In the disengaged position, none of the six load pins or the two chuck pins extend through the aperture in the upper track, which allows the position of the upper track relative to the lower track to be adjusted. The biasing apparatus biases each of the six load pins and the two chuck pins toward the engaged position. The application of a force to the actuation member that overcomes the biasing force causes the actuation member to rotate relative to the base and move the six load pins and the two chuck pins to the disengaged position.

Each of the two chuck pins includes a tapered end configured to engage an edge of one of the openings or apertures in the upper track. Due to the taper of the ends and the force applied to the chuck pins by the biasing apparatus, the contact between the chuck pin and the edge of the opening in the upper track cants each chuck pin within its respective slot in the base. The chuck pins are spaced apart such that the two pins are canted in opposite directions. As a result, the upper track is substantially prevented from moving either forward or rearward relative to the lower track, and the engagement of the latch assembly and the upper track is essentially free of any play or chuck. When each chuck pin is canted, the chuck pin makes three points of contact, one with the edge of the opening in the upper track and one with each side of the slot in which the chuck pin slides. By canting and making the three points of contact, each chuck pin effectively removes any gaps or play that may have previously existed between the chuck pin and the slot and serves to prevent any further movement of the upper track that would tend to further cant the chuck pin.

Other ways in which the various features of the present invention can be accomplished will be described later herein, and still others will appear to those skilled in the art after they have read this specification. Such other ways are deemed to fall within the scope of the present invention, if they fall within the scope of any claims that may be provided.

The present invention relates to a track system for a seat. The track system comprises a first track including a plurality of apertures; a second track configured to move relative to the first track and including a plurality of apertures; and a latch assembly coupled to the first track. The latch assembly comprises a base, a first pin, and a second pin. The base comprises a first slot and a second slot. The first pin is moveable in the first slot between a first position, in which the first pin engages the second track and cants in a first direction, and a second position, in which the first pin disengages the second track. The second pin is moveable in the second slot between a first position, in which the second pin engages the second track and cants in a second direction, and a second position, in which the second pin disengages the second track.

The present invention also relates to a track system for a seat. The track system comprises a first track including a plurality of apertures; a second track configured to move relative to the first track and including a plurality of apertures;

and a latch assembly coupled to the first track. The latch assembly comprises a first pin moveable to engage the second track and cant in a first direction; and a second pin moveable to engage the second track and cant in a second direction opposite the first direction.

The present invention further relates to a track system for a seat. The track system comprises an upper track including a plurality of apertures; a lower track configured to move relative to the first track and including a plurality of apertures; and a latch assembly coupled to the lower track. The latch assembly comprises a base, a first pin, and a second pin. The base comprises a first slot and a second slot. The first pin is moveable in the first slot between an extended position and a retracted position, and includes a tapered end, a first lateral edge, and a second lateral edge. On the first pin, the tapered end engages one of the apertures on the upper track, the first lateral edge engages the first slot, and the second lateral edge engages the first slot when the first pin in the extended position. The second pin is moveable in the second slot between an extended position and a retracted position and includes a tapered end, a first lateral edge, and a second lateral edge. On the second pin, the tapered end engages one of the apertures on the upper track, the first lateral edge engages the second slot, and the second lateral edge engages the slot when the second pin in the extended position.

The present inventions further relate to various features and combinations of features shown and described in the disclosed embodiments. Other ways in which the objects and features of the disclosed embodiments are accomplished will be described in the following specification or will become apparent to those skilled in the art after they have read this specification.

DETAILED DESCRIPTION OF THE PREFERRED AND EXEMPLARY EMBODIMENTS

Before providing the description of the exemplary and alternative embodiments of the track systems, it should be noted that references to "outer," "inner," "intermediate," "above," "below," "upper," "lower," "left," "right," "inboard," or "outboard" in this description are merely used to identify the various elements as they are oriented in the figures or as they may be oriented in one or more particular embodiments of the track system. These terms are not meant to limit the element which they describe, as the various elements may be oriented or arranged differently in various track systems.

Figure 1:
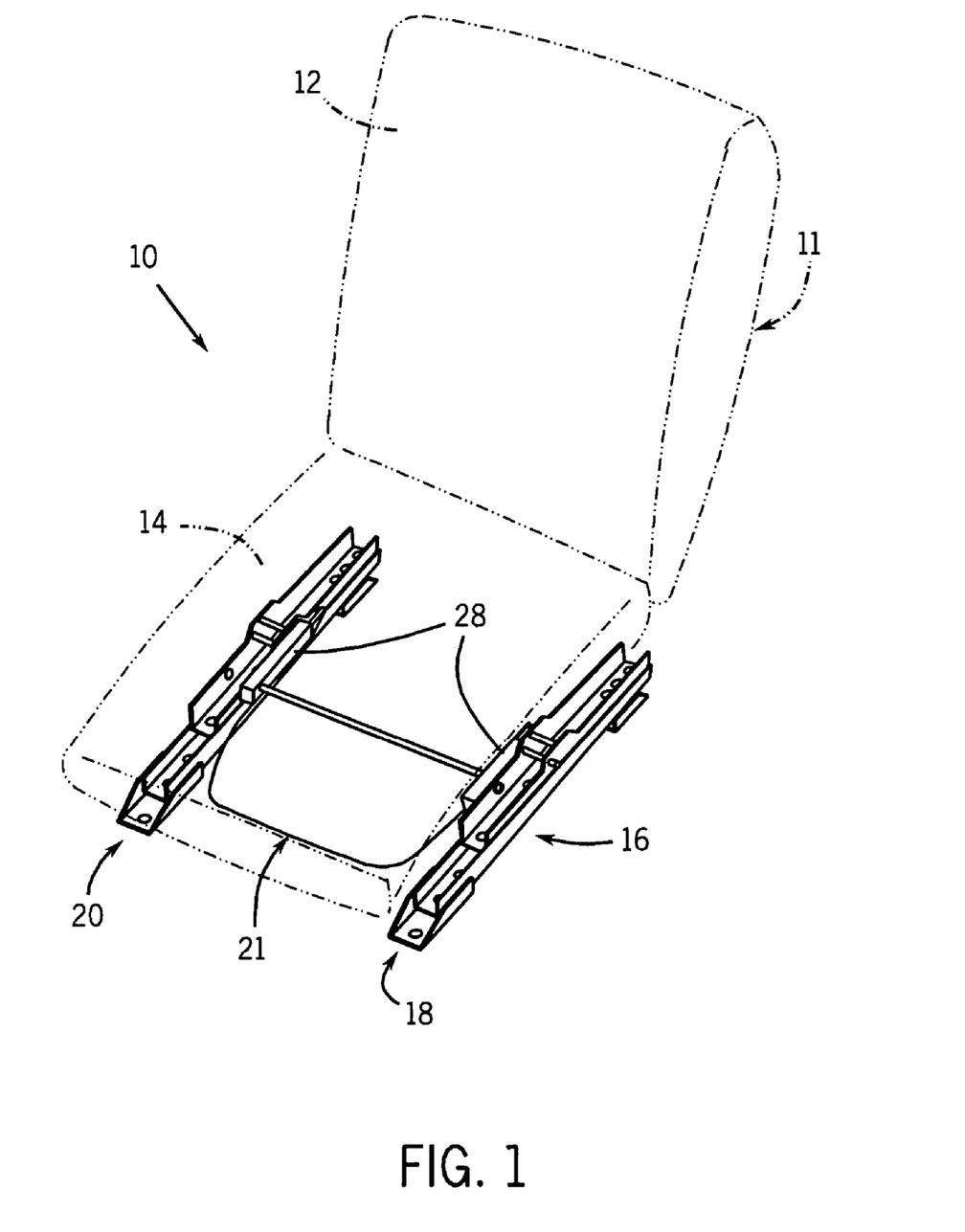
FIG. 1 is a partial, schematic, perspective view of a seat assembly according to one exemplary embodiment of the present invention.

Referring to FIG. 1, a seat assembly 10 is shown according to one exemplary embodiment. Seat assembly 10 includes a seat 11 and a track system 16. Seat 11 generally includes a back portion 12 and a seat cushion portion 14, which each may take any one of a variety of well known configurations. Track system 16 is generally configured to enable an occupant of seat 11 to adjust the position of seat 11 in the vehicle forward and rearward directions.

Track system 16 includes an inboard track arrangement 18, an outboard track arrangement 20, and a lever assembly 21. Inboard track arrangement 18 and outboard track arrangement 20 are coupled to seat cushion portion 14 of seat 11 in a generally spaced-apart and parallel relationship, with inboard track arrangement 18 being located proximate the inboard side of seat cushion portion 14 and outboard track arrangement 20 being located proximate the outboard side of seat cushion portion 14. Lever assembly 21 is generally located between inboard track arrangement 18 and outboard track arrangement 20 in a location that allows an occupant of seat 11 to actuate lever assembly 21. Track arrangements 18 and 20 and lever assembly 21 are configured to cooperate together to allow for the movement or translation of seat 11 relative to the general structure to which seat 11 is coupled, such as the floor of an automobile, when the occupant of seat 11 actuates lever assembly 21. Track arrangement 20 is generally identical to track arrangement 18, except that track arrangement 20 is a mirror image of track arrangement 18. Accordingly, the same reference numbers will be used to refer to like components of track arrangement 20 and track arrangement 18. For simplicity, only track arrangement 18 will be described below, it being understood that the description applies equally to track arrangement 20. Track arrangement 18 includes a lower track 22, an upper track 24, and a latch assembly 28.

Figure 2:
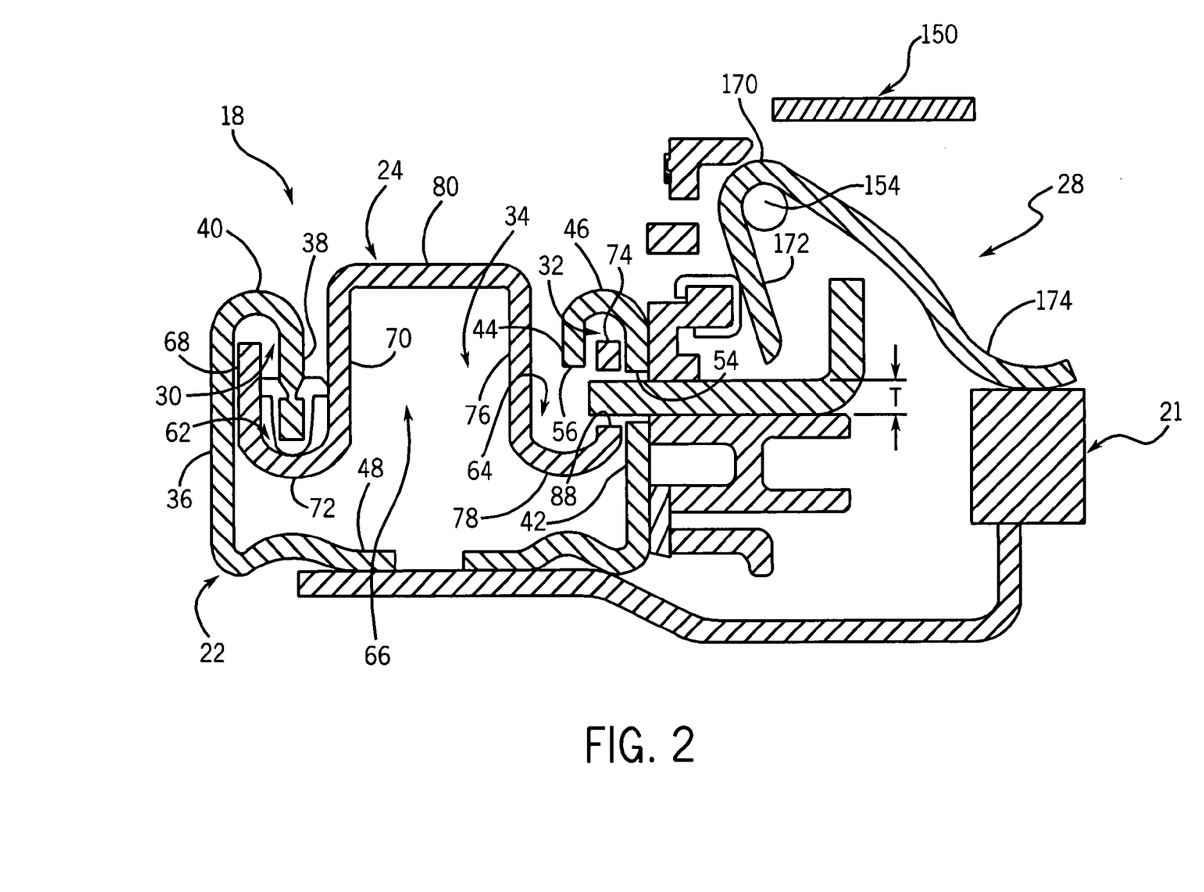
FIG. 2 is a side, cross-sectional view of a track arrangement according to one exemplary embodiment of the present invention.

Referring now to FIG. 2, lower track 22 (e.g., track, rail, slide, guide, etc.) is an elongated and generally rigid member that is configured to be coupled to a structure, such as the floorboard of an automobile, and to generally serve as a guide for upper track 24. According to one exemplary embodiment, lower track 22 is a symmetrical track that includes an outer channel 30, an inner channel 32, and an intermediate channel 34. It should be noted that the terms "outer" and "inner" as used in connection with the upper and lower tracks are intended to refer to the relative position of the particular component or feature of the tracks relative to the center of the seat to which the tracks are coupled.

Outer channel 30 is a generally U-shaped channel that faces downwardly. Outer channel 30 is formed by two generally vertical sidewalls 36 and 38 (the two legs of the "U") that are joined together by an intermediate wall 40 (the base of the "U"). Similarly, inner channel 32 is a generally U-shaped channel that faces downwardly. Inner channel 32 is formed by two generally vertical sidewalls 42 and 44 (the two legs of the "U") that are joined together by an intermediate wall 46 (the base of the "U"). Intermediate channel 34 is a generally upwardly facing, U-shaped channel that is formed by sidewall 38 of channel 30, sidewall 44 of channel 32, and a generally horizontal intermediate wall or base 48 (the base of the "U") that extends between, and couples to, sidewall 36 of channel 30 and sidewall 42 of channel 32.

Sidewall 42 of channel 32 includes a series of apertures 54 (e.g., latch windows, openings, holes, slots, etc.) that are uniformly spaced along the portion of lower track 22 that receives latch assembly 28. Similarly, sidewall 44 of channel 32 includes a corresponding series of apertures 56 (e.g., latch windows, openings, holes, slots, etc.) that are also uniformly spaced along the portion of lower track 22 that receives latch assembly 28 and that are generally aligned with apertures 54. Apertures 54 and 56 are horizontally aligned, rectangular openings that are configured to receive a portion of latch assembly 28 and to thereby retain upper track 24 in its position relative to lower track 22 until latch assembly 28 is released (e.g., until the portion of latch assembly 28 received within one or more of apertures 54 and 56 is removed from at least apertures 56). According to various exemplary and alternative embodiments, the shape, size, spacing, and other characteristics of apertures 54 and 56 may vary, depending at least in part on the particular characteristics of the latching assembly that is used in track arrangement 18.

Referring still to FIG. 2, upper track 24 (e.g., track, rail, slide, etc.) is an elongated and generally rigid member that is configured to be coupled to lower track 22 in a manner that allows upper track 24 to move (e.g., translate or slide) relative to lower track 22. According to one exemplary embodiment, upper track 24 is a symmetrical track that includes an outer channel 62, an inner channel 64, and an intermediate channel 66.

Outer channel 62 is a generally U-shaped channel that faces upwardly. Outer channel 62 is formed by two generally vertical sidewalls 68 and 70 (the two legs of the "U") that are joined together by an intermediate wall 72 (the base of the "U") that extends between sidewall 70 and sidewall 68. Inner channel 64 is a generally U-shaped channel that faces upwardly. Inner channel 64 is formed by two generally vertical sidewalls 74 and 76 (the two legs of the "U") that are joined together by an intermediate wall 78 (the base of the "U") that extends between sidewall 74 and sidewall 76. Intermediate channel 66 is a generally downwardly facing, U-shaped channel that is formed by sidewall 70 of channel 62, sidewall 76 of channel 64, and a generally horizontal intermediate wall or top 80 (the base of the "U") that extends between, and couples to, sidewall 70 of channel 62 and sidewall 76 of channel 64.

Sidewall 74 of channel 64 includes a series of apertures 88 (e.g., latch windows, openings, holes, slots, etc.) that are uniformly spaced along a portion of the length of upper track 24 over a distance that corresponds to the desired range of adjustment of upper track 24 relative to lower track 22. Apertures 88 are generally horizontally aligned, rectangular openings that are configured to cooperate with apertures 54 and 56 of lower track 22 and with latch assembly 28 to allow a portion of latch assembly 28 to extend though apertures 54 in sidewall 42, through apertures 88 in sidewall 74, and through apertures 56 of sidewall 44 to releasably retain upper track 24 in a particular position relative to lower track 22. According to other various alternative and exemplary embodiments, the size, shape, spacing, and configuration of apertures 88 may vary depending on the type of latch assembly that is used with the track arrangement.

Lower track 22 and upper track 24 are coupled together in a manner that allows upper track 24 to translate relative to lower track 22. In this coupled condition, sidewall 68 of upper track 24 extends upwardly into channel 30 of lower track 22, and sidewall 74 of upper track 24 extends generally upwardly into channel 32 of lower track 22. At the same time, sidewall 38 of lower track 22 extends into channel 62 of upper track 24, and sidewall 44 of lower track 22 extends into channel 64 of upper track 24. In other words, outer channel 30 of lower track 22 interlocks or engages outer channel 62 of upper track 24, and inner channel 32 of lower track 22 interlocks or engages inner channel 64 of upper track 24. Friction reducing members or bearings (not shown) may be provided between various portions of upper track 24 and lower track 22 to maintain the alignment of upper track 24 and lower track 22 and to facilitate the translational movement of upper track 24 relative to lower track 22.

Latch assembly 28 (coupler, latching device, lock, fastener, etc.) is a mechanism or assembly that is intended to cooperate with the latching-related apertures in lower track 22 (e.g., apertures 54 and 56) and upper track 24 (e.g., aperture 88) to releasably retain upper track 24 in a fixed positioned relative to lower track 22. According to various exemplary and alternative embodiments, latch assembly 28 is configured to be fixedly coupled in a generally horizontal orientation to the side of sidewall 42 of lower track 22.

According to one exemplary embodiment illustrated in FIGS. 1-8, latch assembly 28 is a positive engagement latch 150 that includes a support structure 152, a pivot rod 154, an actuating member 156, load pins 158, chuck pins 160, and a biasing apparatus 162.

Figure 3:
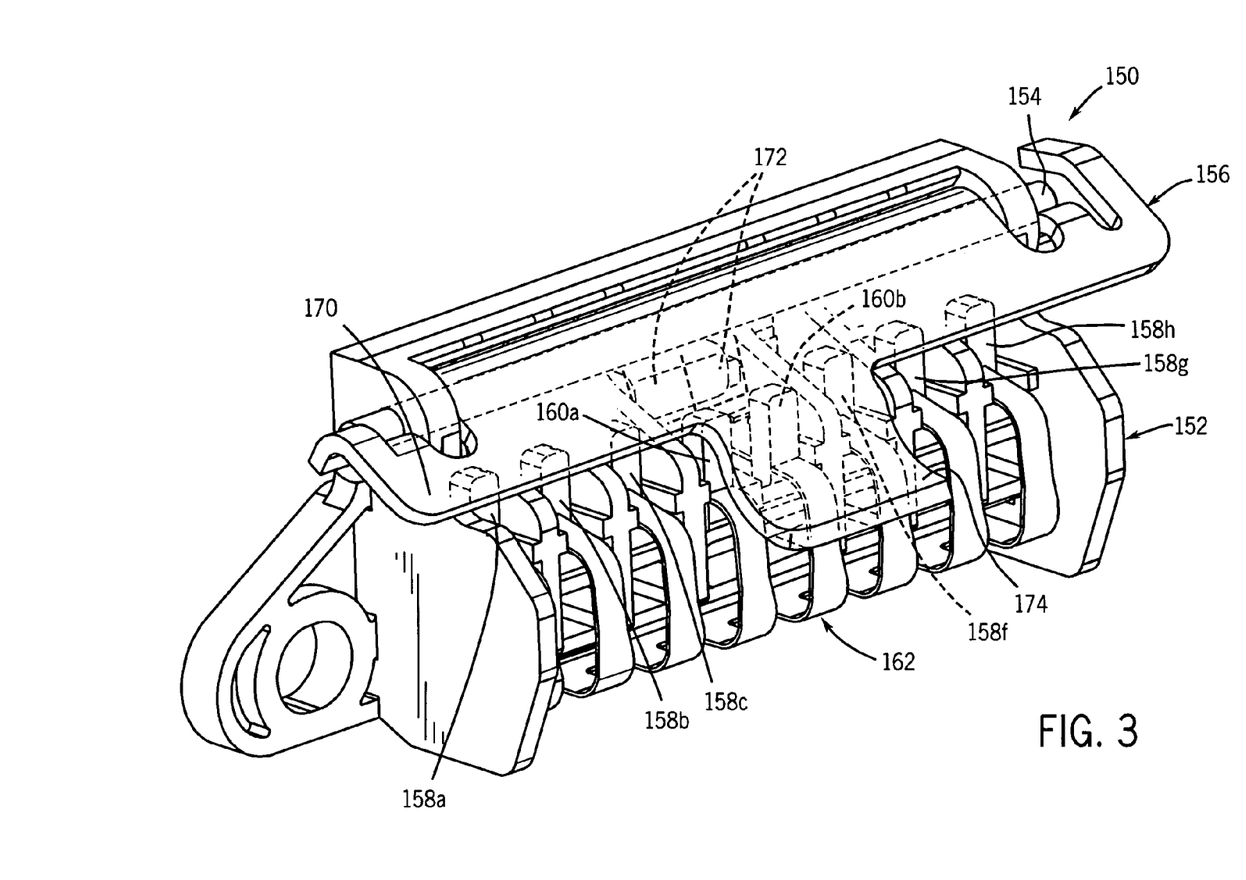
FIG. 3 is a perspective view of a latch assembly according to one exemplary embodiment of the present invention.
Figure 4:
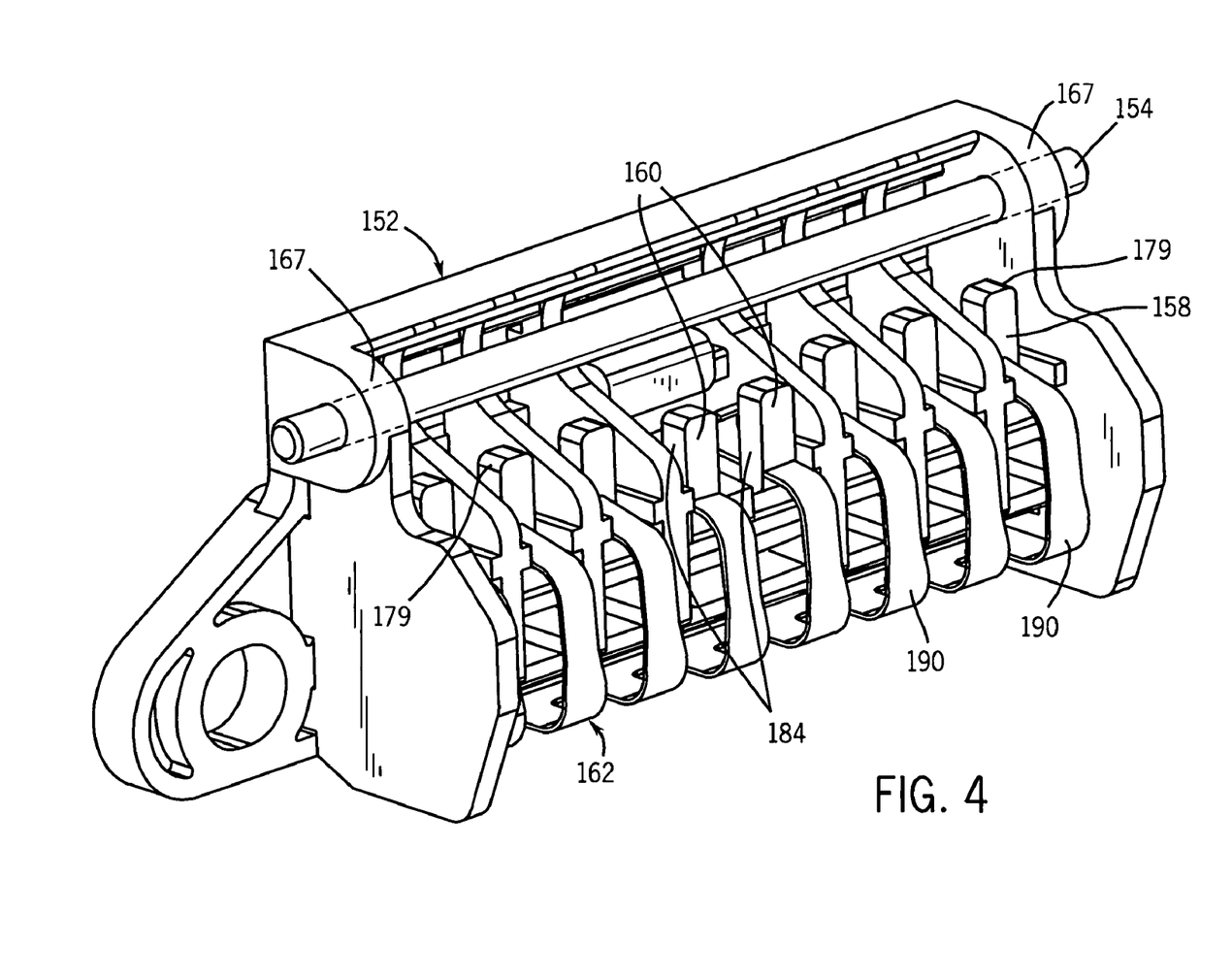
FIG. 4 is a perspective view of the latch assembly of FIG. 3 with the actuating member of the latch assembly removed.
Figure 5:
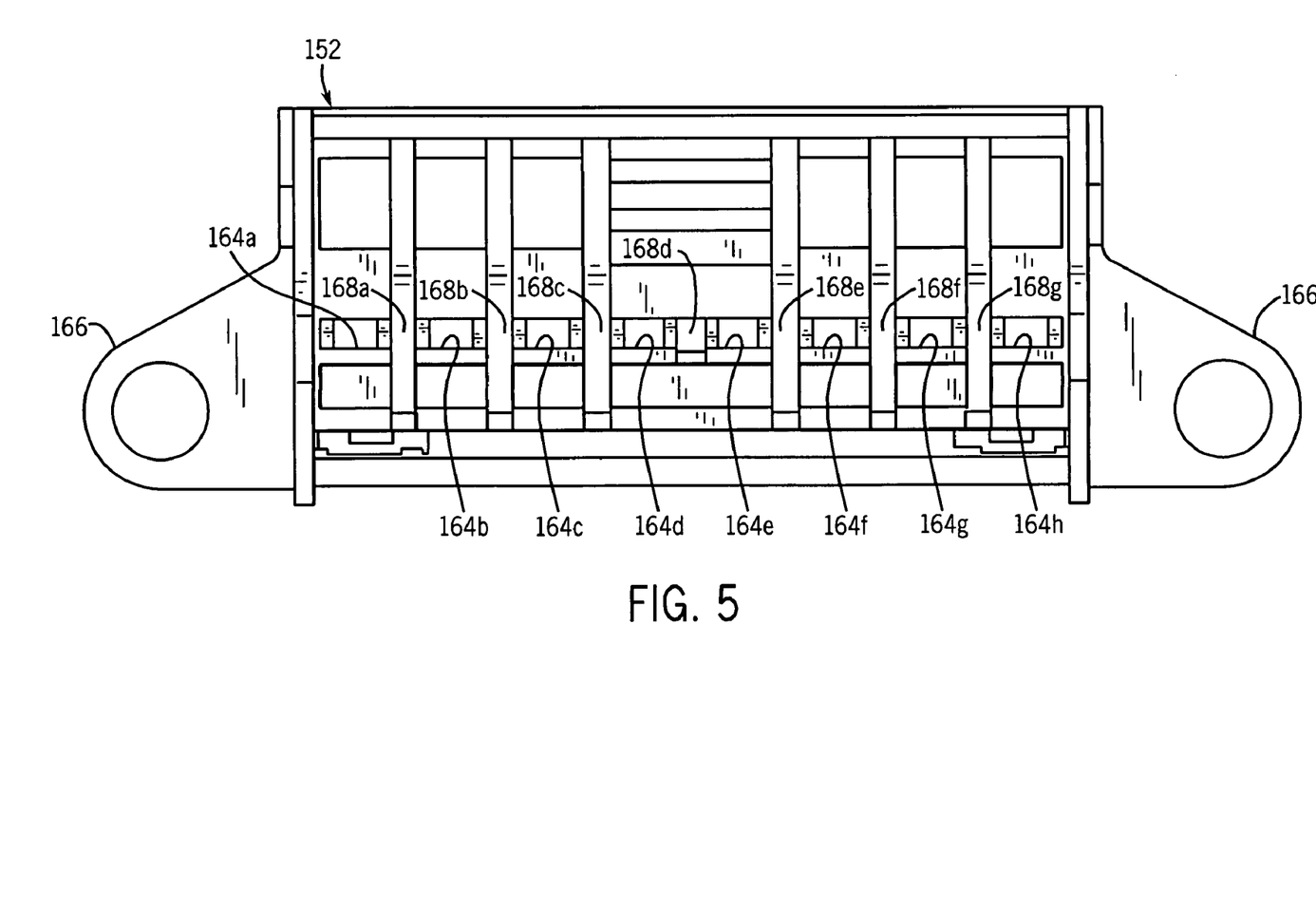
FIG. 5 is a side view of a support structure of a latch assembly according to one exemplary embodiment of the present invention.
Figure 6:
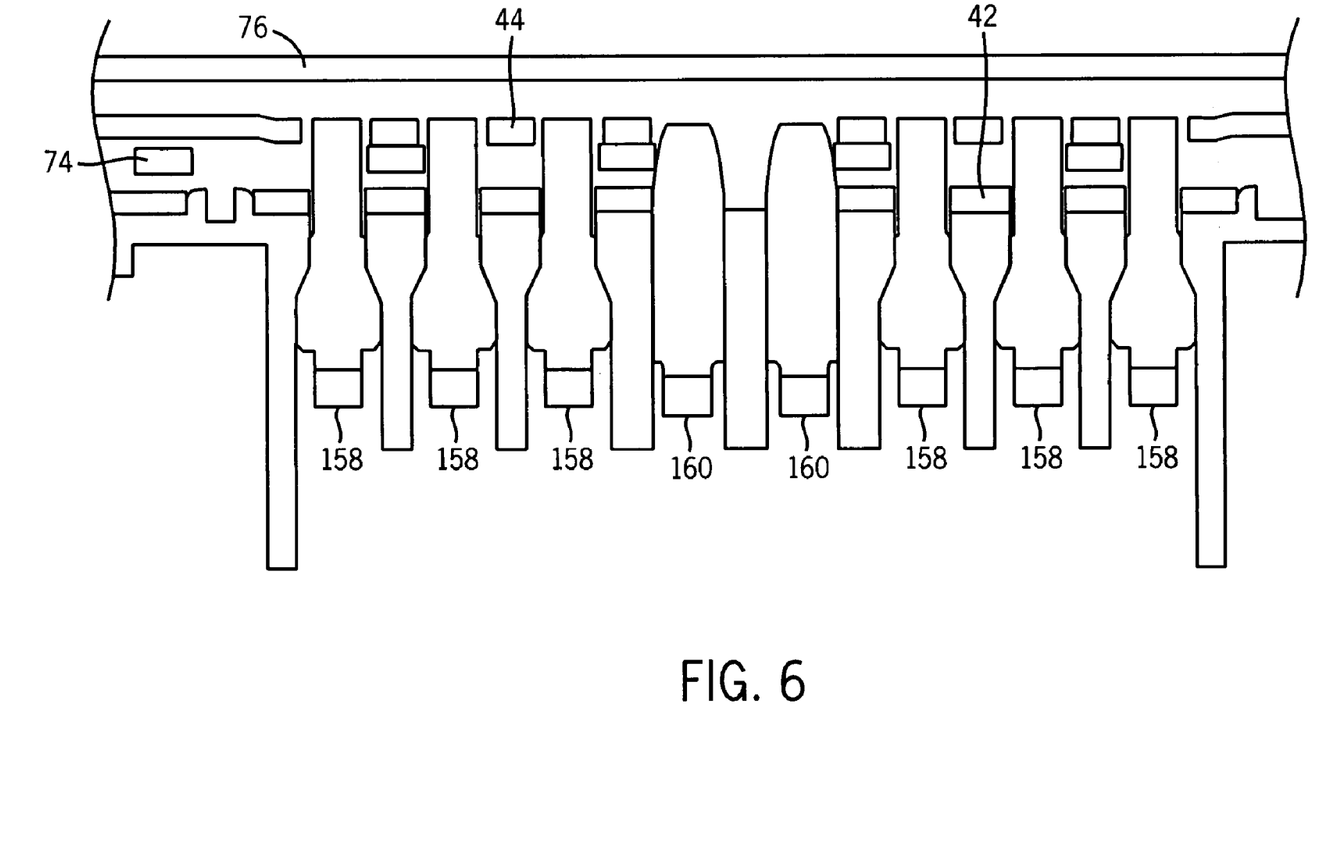
FIG. 6 is a schematic, partial, cross-sectional view illustrating the engagement of the pins of the latch assembly with the tracks of the track arrangement according to one exemplary embodiment of the present invention.

Referring now in particular to FIGS. 3-5, support structure 152 (e.g., frame, brace, guide, support, base, etc.) is a rigid member that is fixedly coupled to sidewall 42. Support structure 152 serves generally as the base of latch 150 and provides a solid structure to which the other components of latch 150 may be coupled, either directly or indirectly. According to one exemplary embodiment, support structure 152 generally includes a mounting structure 166 that facilitates the mounting of support structure 152 to lower track 22 as well as structure for receiving and supporting pivot rod 154 (shown as tabs 167). Support structure 152 also includes eight slots or channels 164a-164h that receive load pins 158 and chuck pins 160 and that facilitate the sliding of load pins 158 and chuck pins 160 toward and away from lower track 22 and upper track 24. According to one exemplary embodiment, the two innermost channels 164d and 164e are configured to receive chuck pins 160, while the remaining channels, 164a, 164b, 164c, 164f, 164g, 164h are each configured to receive load pins 158. To allow for the independent movement of load pins 158 and chuck pins 160, channels 164a-164h are separated by divider walls 168a-168g.

According to various alternative and exemplary embodiments, the support structure may take one of a variety of different shapes, sizes, orientations, and configurations. According to other various alternative and exemplary embodiments, the support structure may include one or more of a variety of different flanges, channels, ribs, etc. to provide the support structure with the appropriate strength and rigidity. According to still other various alternative and exemplary embodiments, the support structure may be integrally-formed as a single unitary body, or may be comprised of two or more separate components coupled together.

As best seen in FIGS. 3-4, pivot rod 154 (e.g., pin, pivot, shaft, beam, bar, etc.) is an elongated member that serves to couple actuating member 156 to support structure 152 in a manner that allows actuating member 156 to rotate or pivot relative to support structure 152. Pivot rod 154 extends between tabs 167 of support structure 152 and provides a pivot point or axis around which actuating member 156 rotates or pivots.

According to various alternative and exemplary embodiments, the pivot rod may take one of a variety of different shapes, sizes, and configurations. According to other various alternative and exemplary embodiments, the pivot pin may be integrally-formed with another component of the latch assembly, such as the support structure or the actuating member.

Referring now to FIG. 3, actuating member 156 (e.g., lever, frame, brace, actuator, pin actuator, etc.) is a generally rigid structure that is intended to rotate or pivot around pivot rod 154 relative to support structure 152 upon the application of a force and to act upon or engage load pins 158 and chuck pins 160 as it rotates. According to one exemplary embodiment, actuating member 156 includes a body 170, eight fingers 172, and a tab 174. Body 170 is a generally rigid structure that couples to pivot pin 154 and that serves as the base to which fingers 172 and tab 174 are coupled. Each of the eight fingers 172 extends from body 170 into one of channels 164a-164h of support structure 152 and is configured to slide load pins 158 or chuck pins 160 away from lower track 22 (thereby releasing a lock between upper track 24 and lower track 22) when actuating member 156 is actuated. Tab 174 also extends from body 170 and generally provides a moment arm against which a portion of lever assembly 21 (e.g., towel bar) acts to actuate actuating member 156 and release the lock between upper track 24 and lower track 22.

According to various alternative and exemplary embodiments, the actuating member may take one of a variety of different shapes, sizes, orientations, and configurations. According to other various alternative and exemplary embodiments, the actuating member may include one or more of a variety of different flanges, channels, ribs, etc. to provide the actuating member with the appropriate strength and rigidity. According to still other various alternative and exemplary embodiments, the actuating member may be integrally-formed as a single unitary body, or may be comprised of two or more separate components coupled together. According to still other alternative and exemplary embodiments, the spacing, orientation, and configuration of the fingers of the actuating member may be altered to cooperate with other configurations or embodiments of the other components of the latch assembly.

As best seen in FIGS. 3, 4, and 6-8, load pins 158 (i.e., load pins 158a, 158b, 158c, 158f, 158g, and 158h) (e.g., bars, shafts, beams, pegs, dowels, posts, fingers, etc.) are elongated, rigid members that are configured to slide within channels 164a, 164b, 164c, 164f, 164g, and 164h of support structure 152, respectively, into and out of apertures 56 in lower track 22, apertures 88 in upper track 24, and apertures 54 in lower track 22. The movement of load pins 158 into and out of apertures 54, 88, and 56 dictates whether upper track 24 is locked in position relative to lower track 22. According to one exemplary embodiment, each of load pins 158 includes a widened portion 176, an engagement portion 178, and a tab or projection 179. Widened portion 176 cooperates with a narrowing taper in channels 164a, 164b, 164c, 164f, 164g, and 164h to provide a positive stop for load pins 158 that prevents them from sliding too far into lower track 22. Engagement portion 178 of load pins 158 is the portion of load pins 158 that is configured to extend into and through apertures 54, 88, and 56. Projection 179 extends perpendicularly from the rear of pin 158 and is configured to be engaged by fingers 172 of actuating member 156 to facilitate the removal of load pins 158 from apertures 54, 88, and 56 when actuating member 156 is actuated.

According to various alternative and exemplary embodiments, the load pins may take one of a variety of different shapes, sizes, and configurations. According to other alternative and exemplary embodiments, the cross-section of the load pins may be cylindrical, rectangular, triangular, octagonal, or one or more of a variety of different shapes, and the cross-section may be constant or variable over the length of the pin.

Referring still in particular to FIGS. 3, 4, and 6-8, chuck pins 160 (i.e., chuck pins 160a and 160b) (e.g., bars, shafts, beams, pegs, dowels, posts, fingers, etc.) are elongated, rigid members that are configured to slide within channels 164d and 164e of support structure 152, respectively, into and out of apertures 54 in lower track 22, apertures 88 in upper track 24, and apertures 56 in lower track 22. The movement of chuck pins 160 into apertures 54, 88, and 56 helps to reduce or eliminate chuck as well as to lock upper track 24 in position relative to lower track 22, while the removal of chuck pins 160 (along with load pins 158) from apertures 88 and 56 releases the lock between lower track 22 and upper track 24. According to one exemplary embodiment, each of chuck pins 160a and 160b includes a body portion 180, an end portion 182, and a tap or projection 184.

Body portion 180 (i.e., body portions 180a and 180b) is a generally elongated, rectangular bar having a length (L), a width (W), and a thickness (T). Body portion 180a of chuck pin 160a includes an inboard edge 186a and an outboard edge 188a that each extend the length of body portion 180a. Inboard edge 186a is located adjacent divider wall 168d of support structure 152 while outboard edge 188a is located adjacent divider wall 168c. Similarly, body portion 180b of chuck pin 160b includes an inboard edge 186b and an outboard edge 188b that each extend the length of body portion 180b. Inboard edge 186b is located adjacent divider wall 168d of support structure 152 while outboard edge 188b is located adjacent divider wall 168e.

End portion 182 (i.e., end portions 182a and 182b) of chuck pins 160 extends from body portion 180 toward tracks 22 and 24 and generally serves as the portion of chuck pins 160 that engages apertures 88 of upper track 24. As end portion 182 extends away from body portion 180, end portion 182 tapers such that the width of end portion 182 reduces as end portion 182 extends away from body portion 180.

Projection 184 (i.e., projections 184a and 184b) extends perpendicularly from the rear of each chuck pin 160 and is configured to be engaged by fingers 172 of actuating member 156 to facilitate the removal of chuck pins 160 from apertures 88, 56 when actuating member 156 is actuated.

According to various alternative and exemplary embodiments, the chuck pins may take one of a variety of different shapes, sizes, and configurations. For example, the four corners or edges extending along the length of the body portion and/or the length of the tapered portion may come to a sharp point, may be radiused, may be partially tapered and partially radiused, or may have some other configuration. According to other alternative and exemplary embodiments, the cross-section of the chuck pins may be cylindrical, rectangular, triangular, octagonal, or one or more of a variety of different shapes, and the cross-section may be constant or variable over the length of the pin.

Referring now to FIGS. 3-4, biasing apparatus 162 (e.g., spring, leaf spring, resilient element, elastic member, etc.) is a resilient structure that is coupled to support structure 152 and that biases load pins 158 and chuck pins 160 toward the position in which they engage apertures 54 and 56 in lower track 22 and apertures 88 in upper track 24. According to one exemplary embodiment, biasing apparatus 162 is a leaf spring having a finger or projection 190 for each of load pins 158 and chuck pins 160 that is configured to act upon projections 179 of load pins 158 and projections 184 of chuck pins 160 to bias load pins 158 and chuck pins 160 toward the engaged position. According to various alternative and exemplary embodiments, the biasing member may be one of a variety of different springs or other elastic or resilient devices, and may take one of a variety of different shapes, sizes, and configurations.

Referring back to FIG. 1, lever assembly 21 is a system of components that is operatively coupled to latch assembly 150 and that serves as the interface between the occupant of seat 11 and latch assembly 150. Generally, lever assembly 21 provides the occupant of seat 11 with the ability to actuate (e.g., release) latch assembly 28 to adjust the fore and aft position of seat 11. According to one exemplary embodiment, lever assembly 21 includes a lever (e.g., towel bar) that engages tab 174 of actuating member 156. Once the occupant of the seat actuates the lever, the lever acts upon tab 174, which in turn results in the actuation of actuating member 156 and the removal of load pins 158 and chuck pins 160 from apertures 88 and 56 of lower track 22 and upper track 24. According to various alternative and exemplary embodiments, the lever assembly may take one of a variety of different shapes, sizes, configurations, and arrangements.

Positive engagement latch 150 is configured to move between an engaged position, in which the position of upper track 24 relative to lower track 22 is locked, and a disengaged position, in which upper track 24 is moveable or slideable relative to lower track 22. Latch 150 is biased toward the engaged position, and remains in the engaged position until an occupant of seat 11 actuates (e.g., directly or indirectly causes the movement of or raises) lever assembly 21. Actuating lever assembly 21 causes latch 150 to move to the disengaged position, which then allows the occupant of seat 11 to move seat 11, in a forward or rearward direction, to a desired position. Once the occupant moves seat 11 to the desired location, the occupant releases lever assembly 21, which in turn allows latch 150 to return to the engaged position (as a result of the bias of latch 150 toward the engaged position) and once again lock the position of upper track 24 relative to lower track 22.

As described above, latch assembly 150 is rigidly coupled to lower track 22. Accordingly, load pins 158 are aligned with apertures 54 of sidewall 42 of lower track 22 and apertures 56 of sidewall 44 of lower track 22. When upper track 24 moves relative to lower track 22, sidewall 74 of upper track 24, which is located between sidewall 42 and sidewall 44 of lower track 22, moves relative to sidewall 42 and sidewall 44. As upper track 24 moves relative to lower track 22, certain apertures 88 of upper track 24 move into and out of alignment with apertures 54 and 56. To lock upper track 24 in place, load pins 158 extend through apertures 54 in sidewall 42, apertures 88 in sidewall 74, and apertures 56 in sidewall 44. Accordingly, load pins 158, which are locked in position with respect to lower track 22 as a result of extending through apertures 54 and 56 and of being received within channels 164 of support structure 152 of latch assembly 28, extend through apertures 88 and thereby also stop upper track 24 from moving relative to lower track 22. According to one exemplary embodiment, each aperture 88 has a width that is sufficient to allow aperture 88 to receive two load pins 158.

According to one exemplary embodiment, the engagement portion 178 of load pins 158 is configured to extend completely through apertures 54, 88, and 56 to retain or lock upper track 24 in position relative to lower track 22. Ideally, the width of apertures 54 and 56 could be made slightly greater than the width of engagement portions 178 of load pins 158, the width of apertures 88 could be made slightly greater than the total width of the engagement portions 178 of two load pins 158, and the size of channels 164 of support structure 152 could be made just large enough to allow load pins 158 to slide within channels 164. In this ideal case, there would be little "play" or "chuck" between load pins 158 and apertures 54, 88, and 56, and between load pins 158 and channels 164. However, under normal manufacturing conditions, it is often difficult to maintain tolerances to a degree that would allow the for/aft "play" or "chuck" between load pins 158 and apertures 54, 88, and 56, and between load pins 158 and channels 164 to be reduced to an unnoticeable or acceptable level.

The inclusion of chuck pins 160a and 160b helps to reduce such chuck or play between load pins 158 and apertures 54, 88, and 56, and between load pins 158 and channels 164, without requiring such tight manufacturing tolerances. Chuck pins 160a and 160b are separated from one another by divider wall 168d and are capable of operating substantially independently of one another. According to one exemplary embodiment, chuck pins 160a and 160b are spaced apart from one another so that the distance between outboard edge 188a of body portion 180a of chuck pin 160a and outboard edge 188b of body portion 180b of chuck pin 160b is greater than the width of apertures 88 in upper track 24. At the same time, chuck pins 160a and 160b are configured so that the distance between inboard edge 186a of body portion 180a of chuck pin 160a and inboard edge 186b of body portion 180b of chuck pin 160b is less than the distance between apertures 88 (or the width of the material between apertures 88). However, the taper of end portions 188a and 188b of chuck pins 160a and 160b, respectively, effectively allows the distances between chuck pins 160a and 160b to be adjusted depending on the extent to which chuck pins 160a and 160b extend into apertures 88. In this configuration, chuck pins 160a and 160b may engage apertures 88 in upper track 24 in one of two ways: (1) each of chuck pins 160a and 160b may engage the same aperture 88 (see FIG. 7), or (2) chuck pin 160a may engage one aperture 88 while chuck pin 160b engages the adjacent aperture 88, with the material between the two adjacent apertures 88 being located between chuck pins 160a and 160b (see FIG. 8).

Figure 7:
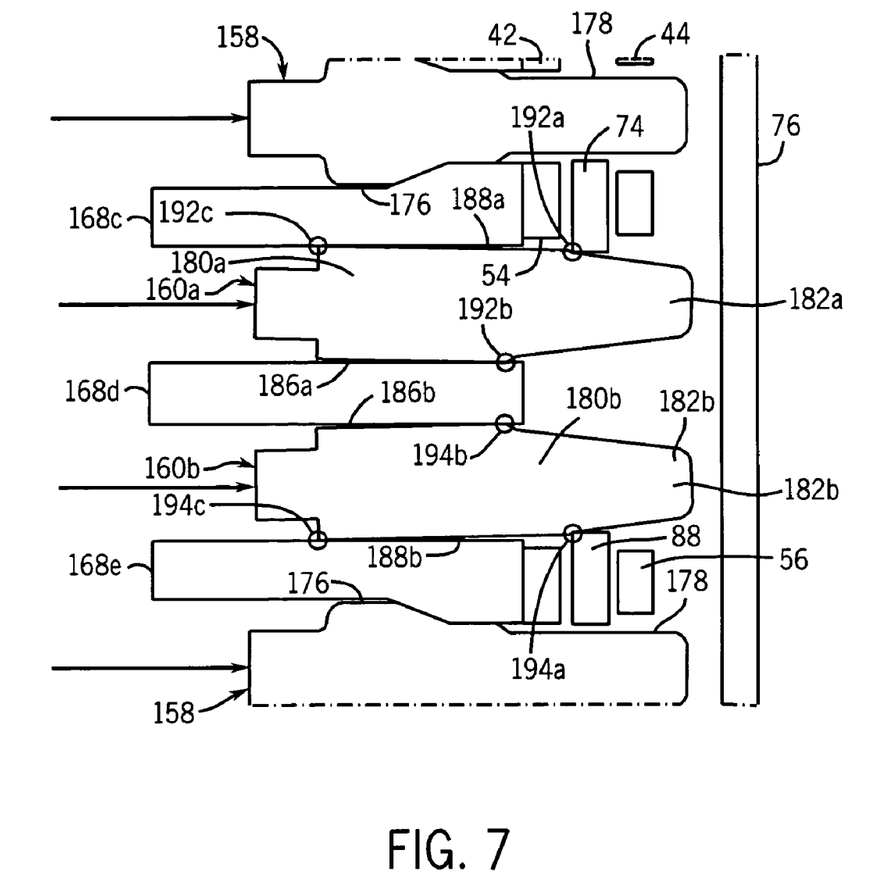
FIG. 7 is a schematic, partial, cross-sectional view illustrating the engagement of the chucks pins of the latch assembly with the tracks of the track arrangement in a first position according to one exemplary embodiment of the present invention.

In the first case, where chuck pins 160a and 160b engage the same aperture 88, the tapered end portions 188a and 188b extend into aperture 88, with end portion 188a contacting one side of aperture 88 and end portion 188b contacting the opposite side of aperture 88. Biasing apparatus 162 applies a forced to chuck pins 160a and 160b that urges chuck pins 160a and 160b into aperture 88 as far as possible. Due to the taper of end portions 188a and 188b, the force applied by biasing apparatus 162 urges end portions 188a and 188b toward one another. To the extent there is any "play" between chunk pins 160a and 160b and the corresponding divider walls 168c, 168d, and 168e that form the respective channels 164d and 164e in support structure 152 in which chunk pins 160a and 160b are received, chunk pins 160a and 160b cant or tilt slightly within channels 164d and 164e. When chuck pin 160a cants within channel 164d, chuck pin 160a has three points of contact: a first point of contact 192a where tapered end portion 182a contacts the edge of aperture 88, a second point of contact 192b where inboard edge 186a contacts divider wall 168d, and a third point of contact 192c where outboard edge 188a contacts the divider wall 168c. As a result of these three points of contact 192a, 192b, and 192c, end portion 182a of chuck pin 160a is prevented from moving any closer to chuck pin 160b (in the absence of any material deformation). Accordingly, chuck pin 160a prevents upper track 24 from moving in a direction that would push end portion 182a of chuck pin 160a toward chuck pin 160b. Similarly, when chuck pin 160b cants within channel 164e, chuck pin 160b has three points of contact: a first point of contact 194a where tapered end portion 182b contacts the edge of aperture 88, a second point of contact 194b where inboard edge 186b contacts divider wall 168d, and a third point of contact 194c wherein outboard edge 188b contacts the divider wall 168e. As a result of these three points of contact 194a, 194b, and 194c, end portion 182b of chuck pin 160b is prevented from moving any closer to chuck pin 160a (in the absence of any material deformation). Accordingly, chuck pin 160b prevents upper track 24 from moving in a direction that would push end portion 182b of chuck pin 160b toward chuck pin 160a. With chuck pin 160a preventing upper track 24 from moving in one direction along lower track 22 (e.g., either the forward direction or the rearward direction) and chuck pin 160b preventing upper track 24 from moving in the opposite direction along lower track 22, chuck pins 160a and 160b generally serve to reduce or eliminate any play or chuck between upper track 24 and lower track 22 (or more specifically between latch assembly 28 and upper track 24).

Figure 8:
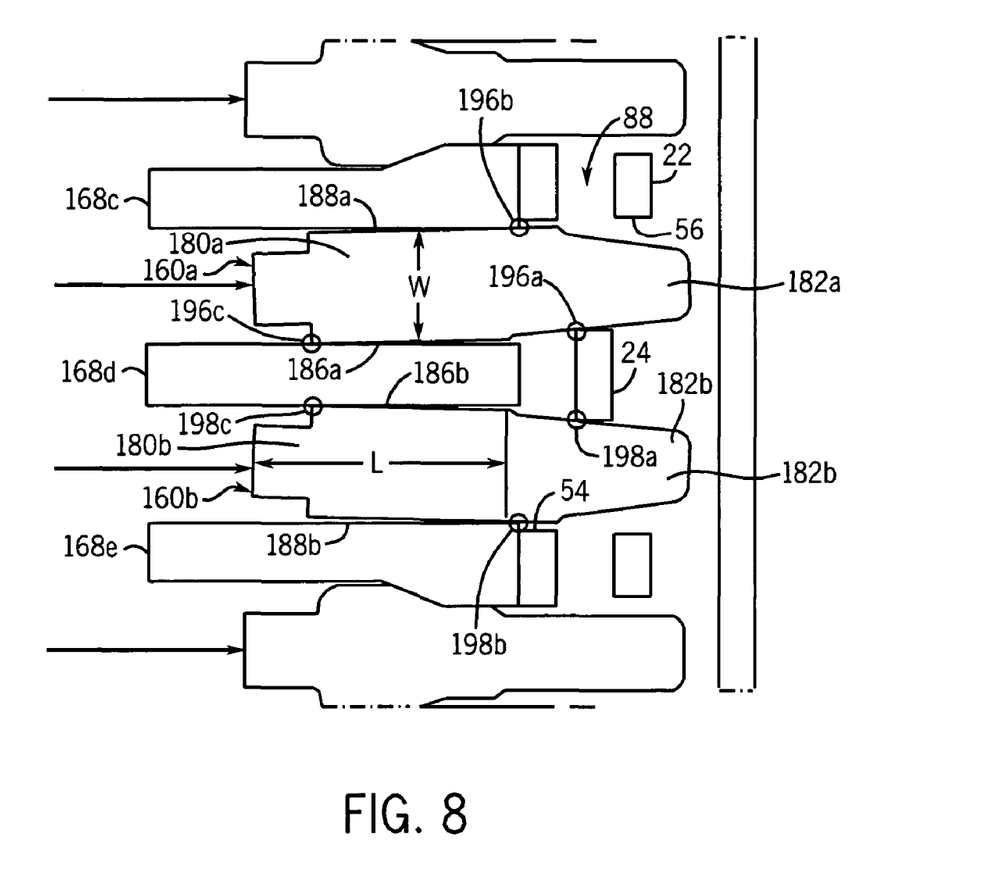
FIG. 8 is a schematic, partial, cross-sectional view illustrating the engagement of the chucks pins of the latch assembly with the tracks of the track arrangement in a second position according to one exemplary embodiment of the present invention.

In the second case, where chuck pins 160a and 160b engage adjacent apertures 88, the tapered end portion 188a of chuck pin 160a extends into a first of the two adjacent apertures 88 and the tapered end 188b extends into a second of the two apertures 88, with end portion 188a contacting one side of the material between the first and second apertures 88 and end portion 188b contacting the opposite side of the material. Biasing apparatus 162 applies a force d to chuck pins 160a and 160b that urges chuck pins 160a and 160b into aperture 88 as far as possible. Due to the taper of end portions 188a and 188b, the force applied by biasing apparatus 162 urges end portions 188a and 188b away from one another. To the extent there is any "play" between chunk pins 160a and 160b and the corresponding divider walls 168c, 168d, and 168e that form the respective channels 164d and 164e in support structure 152 in which chunk pins 160a and 160b are received, chunk pins 160a and 160b cant or tilt slightly within channels 164d and 164e. When chuck pin 160a cants within channel 164d, chuck pin 160a has three points of contact: a first point of contact 196a where tapered end portion 182a contacts a first side of the material between the two apertures 88, a second point of contact 196b where outboard edge 188a contacts divider wall 168c, and a third point of contact 196c wherein inboard edge 186a contacts the divider wall 168d. As a result of these three points of contact 196a, 196b, and 196c, end portion 182a of chuck pin 160a is prevented from moving any farther away from chuck pin 160b (in the absence of any material deformation). Accordingly, chuck pin 160a prevents upper track 24 from moving in a direction that would push end portion 182a of chuck pin 160a away from chuck pin 160b. Similarly, when chuck pin 160b cants within channel 164e, chuck pin 160b has three points of contact: a first point of contact 198a where tapered end portion 182b contacts the second, opposite edge of the material between the two apertures 88, a second point of contact 198b wherein outboard edge 188b contacts the divider wall 168e, and a third point of contact 198c where inboard edge 186b contacts divider wall 168d. As a result of these three points of contact 198a, 198b, and 198c, end portion 182b of chuck pin 160b is prevented from moving any farther away from chuck pin 160a (in the absence of any material deformation). Accordingly, chuck pin 160b prevents upper track 24 from moving in a direction that would push end portion 182b of chuck pin 160b away from chuck pin 160a. With chuck pin 160a preventing upper track 24 from moving in one direction along lower track 22 (e.g., either the forward direction or the rearward direction) and chuck pin 160b preventing upper track 24 from moving in the opposite direction along lower track 22, chuck pins 160a and 160b generally serve to reduce or eliminate any play or chuck between upper track 24 and lower track 22 (or more specifically between latch assembly 28 and upper track 24).

The configuration of chuck pins 160a and 160b and support structure 152 allows chuck pins 160a and 160a to adjust to the tolerances or manufacturing variances that may arise in the manufacturing of the various components of latch assembly 150, lower track 22, and upper track 24 by permitting pins 160a and 160b to extend farther into, or not as far into, the corresponding apertures 88 depending on the tolerance stack up of the various components of latch assembly 150, lower track 22, and upper track 24. Accordingly, the point at which tapered end portions 182a and 182b contact the side of an aperture 88 may vary depending on the tolerance stack-up of the various components of latch assembly 150, lower track 22, and upper track 24. The configuration of chuck pins 160a and 160b is also such that the angle of the tapered end portions 182a and 182b will not cause chuck pins 160a and 160b to retract from, or pop out of, aperture 88 when acted upon by upper track 24.

According to one exemplary embodiment, latch assembly 28 is configured so that load pins 158 carry the majority of the load between upper track 24 and lower track 22, while chuck pins 160 are configured to reduce the chuck between upper track 24 and lower track 22. According to various alternative and exemplary embodiments, the chuck pins may be configured to carry the majority, or all, of the load between upper track 24 and lower track 22. According to other various alternative and exemplary embodiments, the latch assembly may include more than one pair of chuck pins that cooperate in the manner described above. According to still other various alternative and exemplary embodiments, all of the pins of the latch assembly may be chuck pins that are configured to operate in the manner described above. According to still other various alternative and exemplary embodiments, the chuck pins may be incorporated into one or more of a variety of different types of latch assemblies. According to other various alternative and exemplary embodiments, a latch assembly may include more than two chuck pins that cooperate together to reduce chuck. For example, a latch assembly may include three chuck pins, where any two of the three chuck pins cooperate in the manner described above to reduce chuck depending on the position of upper track 24 relative to the latch assembly.

According to other various alternative and exemplary embodiments, the latch assembly may include more or less than six load pins and two chuck pins, and the load pins or chuck pins may be spaced and configured so that all of the load pins or chuck pins fully engage a corresponding aperture in the lower track or so that each of the load pins or chuck pins has a different degree of engagement ranging from fully engaged to not engaged at all. According to other various alternative and exemplary embodiments, the load pins and chuck pins of the latch assembly may be configured to allow the upper track to be locked in position relative to the lower track at one, two, three, or more incremental positions between the positions that the spacing of apertures 54, 56, and 88 would otherwise allow.

According to various alternative and exemplary embodiments, a positive engagement type latch may take one of a variety of different shapes, sizes, and configurations and include components that may take one of a variety of different shapes, sizes, and configurations. According to various alternative and exemplary embodiments, the precise configuration of the different components of a positive engagement type latch may depend on a variety of factors, including space constraints, performance requirements, the characteristics of the seat or automobile or other environment in which the latch will be used, or one or more of a variety of other factors.

According to various alternative and exemplary embodiments, the latch assembly may be any type of latch assembly. According to still other various alternative and exemplary embodiments, the shape, size, or configuration of the pins may vary, and the shape, size, or configuration of one pin of the latch assembly may differ from the shape, size, or configuration of a different pin of the same latch. According to still other various alternative and exemplary embodiments, the different latch assemblies may be coupled to the track assembly at various locations and may be oriented generally horizontally, diagonally, or generally vertically relative exemplary embodiments, only one of the two (or potentially more) track arrangements of the track system may include a latch assembly. According to other alternative and exemplary embodiments, the latch assemblies may be provided on the track arrangements so that they are located on the outside of the seat assembly rather than on the inside.

It is important to note that the term "seat" is intended to be a broad term and not a term of limitation. According to various alternative and exemplary embodiments, the seat track latch assembly may be used with any of a variety of seats, tracks, assemblies, or arrangements and is not intended to be limited to use with automobile seating, or even seating in general, but may be used with any device where the device is intended to be adjusted (e.g., selectively arranged between two different positions). For example, the device may be a seat, but the seat may be vehicle seating or any of a variety of seat assemblies used in airplanes, trains, buses, homes, offices, theaters, or anywhere a seated person may wish to adjust his or her seated position. The device could also be one of a wide variety of other apparatuses that are configured to move relative to a base where it is desirable to reduce or elimination any chuck between the apparatus and the base. According to various other alternative and exemplary embodiments, the latch assembly may be used with one of a variety of other types of objects or structures other than tracks.

It is also important to note that the construction and arrangement of the elements of the latch assembly as shown in the exemplary and alternative embodiments is illustrative only. Although only a few embodiments of the present inventions have been described in detail in this disclosure, those skilled in the art who review this disclosure will readily appreciate that many modifications are possible (e.g., variations in sizes, spacings, dimensions, structures, shapes and proportions of the various elements, values of parameters, mounting arrangements, materials, colors, orientations, etc.) without materially departing from the novel teachings and advantages of the subject matter recited in the claims. For example, a variety of configurations may be provided for the chuck pins and the mounting structure configured to receive the chuck pins. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in any appended claims.

What is claimed is:

1. A track system for a seat, the track system comprising:
a first track including a plurality of apertures;
a second track configured to move relative to the first track and including a plurality of apertures for alignment with respect to the plurality of apertures in the first track; and
a latch-assembly coupled to the first track and comprising:
a base having a first slot and a second slot,
a first pin moveable in the first slot between a first position, in which the first pin engages the second track and moves in a first direction, and a second position, in which the first pin disengages the second track; and
a second pin moveable in the second slot between a first position, in which the second pin engages the second track and moves in a second direction, and a second position, in which the second pin disengages the second track, wherein both the first pin and the second pin include a first portion, a second portion, and a third portion, such that the first portion of the first pin engages one of the apertures on the second track, the second portion of the first pin engages the slot on the base, and the third portion of the first pin engages the first slot when the first pin is in the first position, and wherein the first portion of the second pin engages one of the apertures on the second track, the second portion of the second pin engages the second slot, and the third portion of the second pin engages the slot in the base when the second pin is in the first position.

2. The track system of claim 1 wherein the plurality of apertures on the first track are spaced along the first track.

3. The track system of claim 1 wherein the plurality of apertures on the second track are spaced along the second track.

4. The track system of claim 1 wherein the plurality of apertures on the second track are configured to at least partially align with the plurality of apertures on the first track when the first pin is in the first position.

5. The track system of claim 1 wherein the engagement between the first pin and the first track and second track forms at least three points of contact.

6. The track system of claim 1 wherein the first portion comprises a tapered end.

7. The track system of claim 6 wherein the second portion comprises an inboard edge.

8. The track system of claim 7 wherein the third portion comprises an outboard edge.

9. The track system of claim 8 wherein the tapered end engages the aperture on the second track, the inboard edge engages a first surface of the slot in the base, and the outboard edge engages a second surface of the slot in the base when the first pin is in the first position.

10. The track system of claim 8 wherein the first surface is opposite the second surface in the slot.

11. The track system of claim 9 wherein the first position of the first pin is an engaged condition defined by the engagement between the first pin and the second pin with the second track.

12. The track system of claim 11 wherein the first position of the first pin is an extended condition wherein the first pin and the second pin extend from the base and into the apertures of the first track and the second track.

13. The track system of claim 12 wherein the first pin extends at least partially through one of the apertures on the second track when in the first position.

14. The track system of claim 13 wherein the second position of the first pin is a disengaged condition defined by the disengagement between the first pin and the second pin with the second track.

15. The track system of claim 14 wherein the second position of the first pin is a retracted condition wherein the first pin and the second pin do not extend into the apertures of the second track.

16. The track system of claim 15 wherein the first pin does not extend at least partially through one of the apertures on the second track when in the second position.

17. The track system of claim 1 wherein the first pin comprises a first chuck pin and the second pin comprises a second chuck pin.

18. The track system of claim 17 wherein the first chuck pin and the second chuck pin cant in opposite directions when in the first position.

19. The track system of claim 18 wherein the latch assembly further comprises one or more load pins configured to move between a first position to engage the slots and a second position to disengage the slots.

20. The track system of claim 19 wherein the one or more load pins comprises six load pins.

21. The track system of claim 20 wherein each aperture in the first track has a width sufficient to receive two load pins.

22. The track system of claim 18 wherein the first chuck pin and the second chuck pin are configured to engage the second track either by engaging the same aperture or by engaging adjacent apertures.

23. A track system for a seat of comprising:
a first track including a plurality of apertures;
a second track configured to move relative to the first track and including a plurality of apertures for alignment with respect to the plurality of apertures in the first track; and
a latch-assembly coupled to the first track and comprising:
a base having a first slot and a second slot,
a first pin moveable in the first slot between a first position, in which the first pin engages the second track and moves in a first direction, and a second position, in which the first pin disengages the second track, wherein the first pin is a first chuck pin; and
a second pin moveable in the second slot between a first position, in which the second pin engages the second track and moves in a second direction, and a second position, in which the second pin disengages the second track, wherein the second pin is a second chuck pin and the first chuck pin and the second chuck pin cant in opposite directions when in the first position;
an actuating member configured to rotate relative to the base to move the first pin and the second pin between the first position and the second position; and
one or more load pins configured to move between a first position to engage the slots and a second position to disengage the slots.

24. The track system of claim 23 wherein the latch assembly further comprises a pivot rod that couples the actuating member to the base.

25. The track system of claim 24 wherein the latch assembly further comprises a biasing apparatus that biases the first pin toward the first position.

26. The track system of claim 25 wherein the biasing apparatus comprises a leaf spring.

27. The track system of claim 25 wherein the application of a force to the actuating member overcomes the biasing force and causes the actuating member to rotate relative to the base and move the first pin to the second position.

28. The track system of claim 23 wherein the system is configured to provide non-discrete engagement between the first track and the second track.

29. The track system of claim 23 wherein the engagement between the first pin and the second pin with the base and with the second track substantially inhibits movement between the first track and the second track when the first track is releasably coupled to the second track.

30. The track system of claim 23 wherein the first pin and the second pin engage opposite surfaces on the second track when in the first position.

31. A track system for a seat, the track system comprising:
a first track including a plurality of apertures;
a second track configured to move relative to the first track and including a plurality of apertures; and
a latch assembly coupled to the first track and comprising:
a first pin moveable to engage the second track and cant in a first direction;
a biasing apparatus that biases the first pin toward the first position; and
a second pin moveable to engage the second track and cant in a second direction opposite the first direction, wherein the both the first pin and the second pin comprise a first portion, a second portion, and a third portion, wherein the first portion of the first pin engages one of the apertures on the second track, the second portion of the first pin engages the slot on the base, and the third portion of the first pin engages the first slot when the first pin is in the first position, and wherein the first portion of the second pin engages one of the apertures on the second track, the second portion of the second pin engages the second slot, and the third portion of the second pin engages the slot in the base when the second pin is in the first position.

32. The track system of claim 31 wherein the first pin and the second pin are configured to engage the second track by engaging the same aperture or by engaging adjacent apertures.

33. The track system of claim 31 wherein the first pin and the second pin are configured to engage the second track by engaging adjacent apertures.

34. The track system of claim 31 further comprising a base with a first slot and a second slot spaced apart from the first slot, wherein the both the first pin and the second pin comprise a first portion, a second portion, and a third portion, wherein the first portion of the first pin engages one of the apertures on the second track, the second portion of the first pin engages the slot on the base, and the third portion of the first pin engages the first slot when the first pin is in the first position, and wherein the first portion of the second pin engages one of the apertures on the second track, the second portion of the second pin engages the second slot, and the third portion of the second pin engages the slot in the base when the second pin is in the first position.

35. The track system of claim 34 wherein the second portion engages a first surface of the first slot, and the third portion engages a second surface of the second slot when the first pin is in the first position.

36. The track system of claim 35 wherein the first surface is opposite the second surface in the slot.

37. A track system for a seat, the track system comprising:
an upper track including a plurality of apertures;
a lower track configured to move relative to the upper track and including a plurality of apertures; and a latch assembly coupled to the lower track and comprising:
  a base having a first slot and a second slot,
  a first pin moveable in the first slot between an extended position and a retracted position, and having a tapered end, a first lateral edge, and a second lateral edge, wherein the tapered end engages one of the apertures on the upper track, the first lateral edge engages the first slot, and the second lateral edge engages the first slot when the first pin in the extended position; and
  a second pin moveable in the second slot between an extended position and a retracted position, and having a tapered end, a first lateral edge, and a second lateral edge, wherein the tapered end engages one of the apertures on the upper track, the first lateral edge engages the second slot, and the second lateral edge engages the slot when the second pin in the extended position.

38. The track system of claim 37 wherein the first pin and the second pin are configured to engage the upper track by either engaging the same aperture on the upper track or by engaging adjacent apertures on the upper track.

39. The track system of claim 37 wherein the engagement between the first pin and the first track and second track forms at least three points of contact.

40. The track system of claim 37 wherein the both the first pin and the second pin comprise a tapered end portion, a first lateral edge, and a second lateral edge, wherein the tapered end portion of the first pin engages one of the apertures on the upper track, the first lateral edge of the first pin engages the first slot, and the second lateral edge of the first pin engages the first slot when the first pin is in the extended position, and wherein the tapered end portion of the second pin engages one of the apertures on the upper track, the first lateral edge of the second pin engages the first slot, and the second lateral edge of the second pin engages the second slot when the second pin is in the extended position.

41. The track system of claim 40 wherein the first lateral edge of the first pin engages a first surface of the first slot, and the second lateral edge of the first pin engages a second surface of the first slot when the first pin is in the first position.

42. The track system of claim 41 wherein the first surface is opposite the second surface in the slot.

43. The track system of claim 37 wherein the first pin and the second pin engage opposite surfaces on the second track when in the first position.

44. A track system for a seat, the track system comprising:
  a first track including a plurality of apertures;
  a second track configured to move relative to the first track and including a plurality of apertures for alignment with respect to the plurality of apertures in the first track; and
  a latch-assembly coupled to the first track and comprising:
    a base having a first slot and a second slot,
    a first pin moveable in the first slot between a first position, in which the first pin engages the second track and moves in a first direction, and a second position, in which the first pin disengages the second track; and
    a second pin moveable in the second slot between a first position, in which the second pin engages the second track and moves in a second direction, and a second position, in which the second pin disengages the second track; and
  wherein the both the first pin and the second pin comprise a first portion, a second portion, and a third portion, wherein the first portion of the first pin engages one of the apertures on the second track, the second portion of the first pin engages the slot on the base, and the third portion of the first pin engages the first slot when the first pin is in the first position, and wherein the first portion of the second pin engages one of the apertures on the second track, the second portion of the second pin engages the second slot, and the third portion of the second pin engages the slot in the base when the second pin is in the first position.

45. The track system of claim 44 wherein the first pin and the second pin are configured to engage the upper track by either engaging the same aperture on the upper track or by engaging adjacent apertures on the upper track.

46. The track system of claim 44 wherein the engagement between the first pin and the first track and second track forms at least three points of contact.

47. The track system of claim 44 wherein the both the first pin and the second pin comprise a tapered end portion, a first lateral edge, and a second lateral edge, wherein the tapered end portion of the first pin engages one of the apertures on the upper track, the first lateral edge of the first pin engages the first slot, and the second lateral edge of the first pin engages the first slot when the first pin is in the extended position, and wherein the tapered end portion of the second pin engages one of the apertures on the upper track, the first lateral edge of the second pin engages the first slot, and the second lateral edge of the second pin engages the second slot when the second pin is in the extended position.

48. The track system of claim 47 wherein the first lateral edge of the first pin engages a first surface of the first slot, and the second lateral edge of the first pin engages a second surface of the first slot when the first pin is in the first position.

49. The track system of claim 48 wherein the first surface is opposite the second surface in the slot.

50. The track system of claim 44 wherein the first pin and the second pin engage opposite surfaces on the second track when in the first position.

* * * * *